United States Patent [19]

Gregg et al.

[11] Patent Number: 5,610,945
[45] Date of Patent: Mar. 11, 1997

[54] SYSTEM FOR IDENTIFYING COMMUNICATION SEQUENCES TRANSMITTED ACROSS MULTIPLE CARRIERS BY EXAMINING BIT STREAMS FOR SEQUENCES OF VALID WORDS

[75] Inventors: Thomas A. Gregg, Highland; Joseph M. Hoke, Millerton; Kulwant M. Pandey, Lagrangeville, all of N.Y.

[73] Assignee: International Business Machines Corporation, Armonk, N.Y.

[21] Appl. No.: 477,927

[22] Filed: Jun. 7, 1995

Related U.S. Application Data

[63] Continuation of Ser. No. 147,702, Nov. 4, 1993.

[51] Int. Cl.$^6$ ............................................... H04L 29/04
[52] U.S. Cl. ........................................ 375/260; 395/250
[58] Field of Search ................................. 375/260, 267, 375/299; 455/59, 137; 370/112, 118, 110.1, 85.9

[56] References Cited

U.S. PATENT DOCUMENTS

| | | | |
|---|---|---|---|
| 4,703,475 | 10/1987 | Dretzka et al. | 370/60 |
| 4,734,920 | 3/1988 | Betts | 375/222 |
| 4,864,567 | 9/1989 | Giorgio | 370/118 |
| 4,885,738 | 12/1989 | Bowers et al. | 370/58.1 |
| 4,918,689 | 4/1990 | Hui | 370/85.9 |
| 5,003,558 | 3/1991 | Gregg et al. | 375/108 |
| 5,025,458 | 6/1991 | Casper et al. | 375/114 |
| 5,065,396 | 11/1991 | Castellano et al. | 370/84 |
| 5,293,378 | 3/1994 | Shimizu | 370/94.1 |
| 5,408,473 | 4/1995 | Hutchison et al. | 370/100.1 |

*Primary Examiner*—Richard L. Ellis
*Attorney, Agent, or Firm*—Lynn L. Augspurger; Kevin P. Radigan

[57] ABSTRACT

A system and method for asynchronously receiving data blocks, in parallel, across multiple fibers in a serial manner. Frame groups are provided as a mechanism to transmit associated data serially on each fiber and tie the data being transmitted together. The frame groups do not have sequence numbers, therefore, the receiver determines which frames are part of a frame group by the arrival times of the individual frames. The transceivers for each member of the parallel bus examine the received bit stream to extract frames and continuous sequences. For each member of the parallel bus there are independent receive buffers, and these buffers are controlled by independent states. The states inhibit erroneously generated frames from corrupting the contents of the receive buffers and inhibit the loading of the buffers after errors on the link. These states also control the loading of the receive buffers after retransmission of a buffer area. The information from the individual frames of the frame group is assembled in the proper sequence by another element in the channel. This element also suppresses notification of the intermediate frame groups when multiple frame groups are used to transmit a buffer area.

26 Claims, 13 Drawing Sheets

FIG. 8

| STATE | WORD (I) IDLE | (D) DATA | (E) CV/UK | (X) LOS,RESET |
|---|---|---|---|---|
| RESET | IDLE,0 | RESET 6 | RESET - | RESET 2 |
| IDLE,0 | IDLE,1 | CS,1/RESET 7 | RESET 1 | RESET 2 |
| IDLE,1 | IDLE,2 | CS,1/RESET 6,7 | RESET 1 | RESET 2 |
| IDLE,2 | IDLE,3 | CS,1/RESET 6,7 | RESET 1 | RESET 2 |
| IDLE,3 | IDLE,4 | CS,1/RESET 6,7 | RESET 1 | RESET 2 |
| IDLE,4 | IDLE,5 | CS,1/RESET 6,7 | RESET 1 | RESET 2 |
| IDLE,5 | IDLE,6 | CS,1/RESET 6,7 | RESET 1 | RESET 2 |
| IDLE,6 | IDLE,7 3 | CS,1/RESET 6,7 | RESET 1 | RESET 2 |
| IDLE,7 | IDLE | CS,1/RESET 6,7 | RESET 1 | RESET 2 |
| IDLE | IDLE | DATA0 8 | ERROR 1 | RESET 2 |
| CS,0 | IDLE,1 5 | CS,1/RESET 9 | RESET 1 | RESET 2 |
| CS,1 | CS,2/CS,0 10 | RESET 5,6 | RESET 1 | RESET 2 |
| CS,2 | IDLE,1 6 | CS,3/1/RESET 11 | RESET 1 | RESET 2 |
| CS,3 | CS,4 | RESET 6 | RESET 1 | RESET 2 |
| CS,4 | IDLE,1 6 | CS,5/1/RESET 11 | RESET 1 | RESET 2 |
| CS,5 | CS,6 | RESET 6 | RESET 1 | RESET 2 |
| CS,6 | IDLE,1 6 | CS,1/RESET 12 | RESET 1 | RESET 2 |
| DATA0 | CS,2/ERROR 13 | DATA1/ERROR 14 | ERROR 1 | RESET 2 |
| DATA1 | IDLE/ERROR 15 | DATA2/ERROR 16 | ERROR 1 | RESET 2 |
| DATA2 | ERROR 6 | DATAN 17 | ERROR 1 | RESET 2 |
| DATAN | IDLE 18 | DATAN 17 | ERROR 1 | RESET 2 |
| ERROR | IDLE | ERROR - | ERROR 1 | RESET 2 |

FIG. 9

| EVENT \ STATE | UNLOCKED | LOCKED | ERROR |
|---|---|---|---|
| LCW DET | UNLOCKED /ERROR  1 | LOCKED  2 | ERROR  2 |
| DATA FROM ISM | UNLOCKED  3 | LOCKED  - | ERROR  - |
| EOF DET | LOCKED  4 | LOCKED  - | ERROR  - |
| ERROR | ERROR  - | LOCKED  - | ERROR  - |
| UNLOCK COMMAND | UNLOCKED  - | UNLOCKED  - | UNLOCKED  - |
| LOCK COMMAND | LOCKED  - | LOCKED  - | LOCKED  - |

FIG. 10

| EVENT | STATE 1004 | | | |
|---|---|---|---|---|
| | UNLOCKED | ACTIVE | LOCKED | ERROR |
| LCW DET START=0 | UNLOCKED — | ACTIVE — | LOCKED 4 | ERROR — |
| LCW DET START=1 | ACTIVE/ ERROR 1 | ERROR 5 | LOCKED 4 | ERROR — |
| DATA FROM ISM | UNLOCKED — | ACTIVE/ ERROR 2 | LOCKED — | ERROR — |
| EOF DET | UNLOCKED — | LOCKED/ ACTIVE/ ERROR 3 | LOCKED — | ERROR — |
| ERROR | UNLOCKED — | ERROR — | LOCKED — | ERROR — |
| UNLOCK COMMAND | UNLOCKED — | UNLOCKED — | UNLOCKED — | UNLOCKED — |
| LOCK COMMAND | LOCKED — | LOCKED — | LOCKED — | LOCKED — |

FIG. 13

| EVENT | STATE | | | |
|---|---|---|---|---|
| | IDLE | ACTIVE | SUS-PENDED | SUP S=0 (SUPPRESS START=0) |
| LCW COMPLETE START=1 | ACTIVE / PUTAWAY | SUP S=0 / PUTAWAY | ACTIVE / PUTAWAY | ACTIVE / PUTAWAY |
| LCW NOT COMPLETE START=1 | SUP S=0 / PUTAWAY | SUP S=0 / PUTAWAY | SUP S=0 / PUTAWAY | SUP S=0 / PUTAWAY |
| LCW COMPLETE START=0 DAT EXP/ MSK COMPARE | SUP S=0 / PUTAWAY | SUP S=0 / PUTAWAY | ACTIVE / – | SUP S=0 / – |
| LCW COMPLETE START=0 DAT EXP/ MSK MISCOMPARE | SUP S=0 / PUTAWAY | SUP S=0 / PUTAWAY | SUP S=0 / PUTAWAY | SUP S=0 / – |
| LCW NOT COMPLETE START=0 | SUP S=0 / PUTAWAY | SUP S=0 / PUTAWAY | SUP S=0 / PUTAWAY | SUP S=0 / – |
| END OF FRAME COUNT SAT | – / – | IDLE / PUTAWAY | – / – | – / – |
| END OF FRAME COUNT NOT SAT | – / – | SUS-PENDED / – | – / – | – / – |
| ERROR -AFTER LCW -BEFORE EOF | – / – | SUP S=0 / PUTAWAY | – / – | – / – |

SYSTEM FOR IDENTIFYING COMMUNICATION SEQUENCES TRANSMITTED ACROSS MULTIPLE CARRIERS BY EXAMINING BIT STREAMS FOR SEQUENCES OF VALID WORDS

This application is a continuation, of application Ser. No. 08/147,702, filed Nov. 4, 1993.

FIELD OF THE INVENTION

The present invention relates to data communications systems. More particularly, the present invention relates to data communication systems using optical fibers to carry information.

These co-pending applications and the present application are owned by one and the same assignee, International Business Machines Corporation of Armonk, N.Y.

The descriptions set forth in these co-pending applications are hereby incorporated into the present application by this reference.

BACKGROUND OF THE INVENTION

Transmission of serial data is usually performed by encoding the data into entities called frames, and between transmission of frames an idle sequence is transmitted. Additionally, several modifications of the idle sequence are transmitted to signal primitive link conditions. Further, to increase bandwidth between computing elements, multiple serial conductors can be coupled to increase the transmission speed.

The first step in receiving information from a single serial source is recognizing bit sequences. The bits are usually grouped into characters or, in this case, groups of characters called words. A precise interpretation of all possible sequences, including those caused by errors due to noise and/or design errors, must be defined so that all equipment connected to the serial link has a consistent interpretation.

Most frames containing information fields (data) require a buffer at the receiving end of the link. Usually, the contents of a frame directed at a particular buffer is simply loaded into the targeted buffer. The protocols on the link usually insure that frames sent over the link do not erroneously overwrite the contents of the receiving buffer. To protect the contents and operation of receiving buffers, the concept of receive buffer states is introduced.

When multiple frames are used to send data to a single buffer, each frame has to be processed, and the more frames that are used to send a given amount of data, the more processing overhead is required. By adding hardware to determine the beginning and end of a buffer transfer, the processing overhead is reduced.

Finally, when multiple serial conductors are coupled to increase the transmission speed, the information in the frames has to be assembled and disassembled for the message to be intelligible. Normally, this processes is designed for a fixed number of conductors. This process must be extended to accommodate a variable number of conductors.

SUMMARY OF THE INVENTION

The present invention comprises a system and method for receiving information across multiple carriers in a serial manner. A group of state machines is used to process the sequence of received bits into a simple group of indicators that are used to receive information from the link and to determine recovery actions.

It is a primary objective of the present invention to completely define the result of all possible sequences of serial bits received over multiple conductors such that information can be properly extracted and error conditions can be accurately reported with the least latency.

It is another objective of the present invention to provide a state machine defining reception requirements for frames and idle sequences (including continuous sequences) for individual conductors.

It is another objective of the present invention to provide a set of states for each of the multiple receive buffers for the multiple link conductors to ensure that frames are accepted only at specific times in the message passing sequence.

It is another objective of the present invention to provide a central set of states that allows the receipt of multiple frame groups appear as a single frame group.

It is another objective of the present invention to automatically destripe received secondary commands and automatically stripe the responses to these secondary commands,

BRIEF DESCRIPTION OF THE DRAWINGS

The present invention will be better understood by reference to the drawings in which:

FIG. 8 is a state table for receiving all sequences from the serial link;

FIG. 9 is a state table controlling the operation of a request or response buffer in the Link Adapter;

FIG. 10 is a state table controlling the operation of a data buffer in the Link Adapter;

FIG. 13 is a state table used by the Link Controller to monitor the operation of the data buffers;

DETAILED DESCRIPTION OF THE PREFERRED EMBODIMENTS

Figure 1:
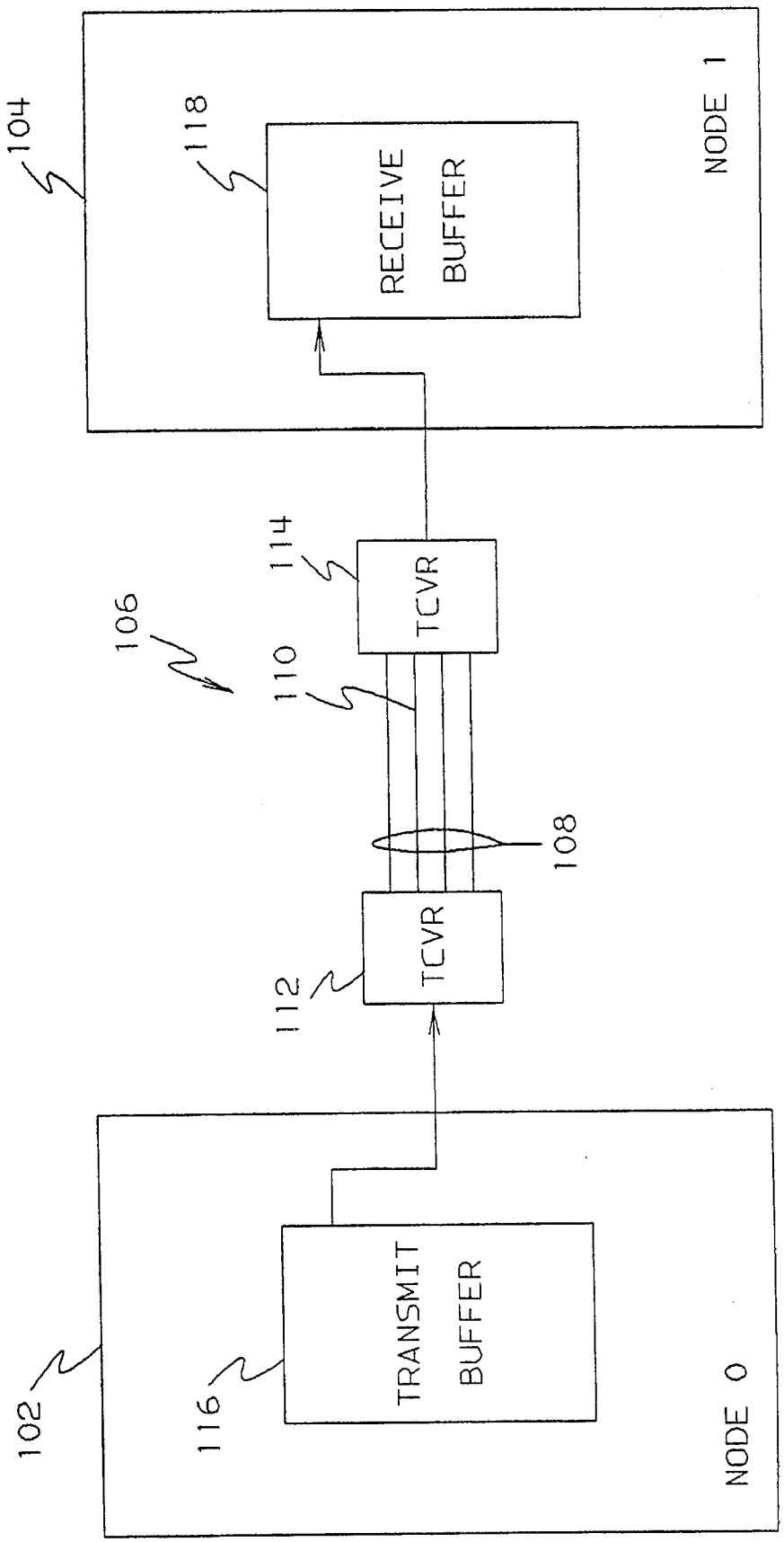
FIG. 1 is a block diagram of a physical link between two computing elements.

Turning first to FIG. 1, a physical link between two computing elements 102, 104 is illustrated. These elements could be, for example, two computers or a computer and a shared memory device. In any event, the computing elements 102, 104 are connected by way of an intersystem channel link 106 comprising a fiber optic bus 108. The fiber optic bus 108 is formed of multiple fiber pairs 110. Each fiber pair consists of two optical fibers, one for transmitting information and one for receiving information. While any number of fiber pairs can be used, exemplary values for intersystem channels would be a range of 1 to 64 fiber pairs in powers of two. The fiber pairs 110 of the fiber optic bus 108 are coupled to the computing elements 102, 104 by way of transceivers 112, 114 located at opposite ends bus. Each of the transceivers 112, 114 includes a transmitter unit and a receiver unit, both of which will be described in more detail later.

All of the data traffic over the fiber optic bus 108 supports message passing between the computing elements 102, 104. A typical message is a request sent from computing element 102 to computing element 104. Data may be associated with the request and is either sent from computing element 102 to computing element 104 (a write operation) or from computing element 104 to computing element 102 (a read operation). After the data is transferred, a response is sent from computing element 104 to computing element 102. The messages, consisting of requests, data, and responses is stored in buffers located in both computing elements. To transfer a request, data, or response, a transmit buffer 116 is required in the transmitting computer element 102, and a receive buffer 118 is required in the receiving computer element 104. In practice, transmit buffers and receive buffers are required in both computing elements in order to complete a message passing operation; this is described later. It should be understood that the transmitting buffer 116 may be located anywhere in the transmitting computer element 102, including the main processor storage. It should be further understood that the receive buffers must at all times be immediately accessible by the transceiver 114. Therefore, the receive buffer 118 is usually implemented as an array dedicated to the channel, and it is not in main processor storage where access is shared among many different elements within the computer.

Figure 2:
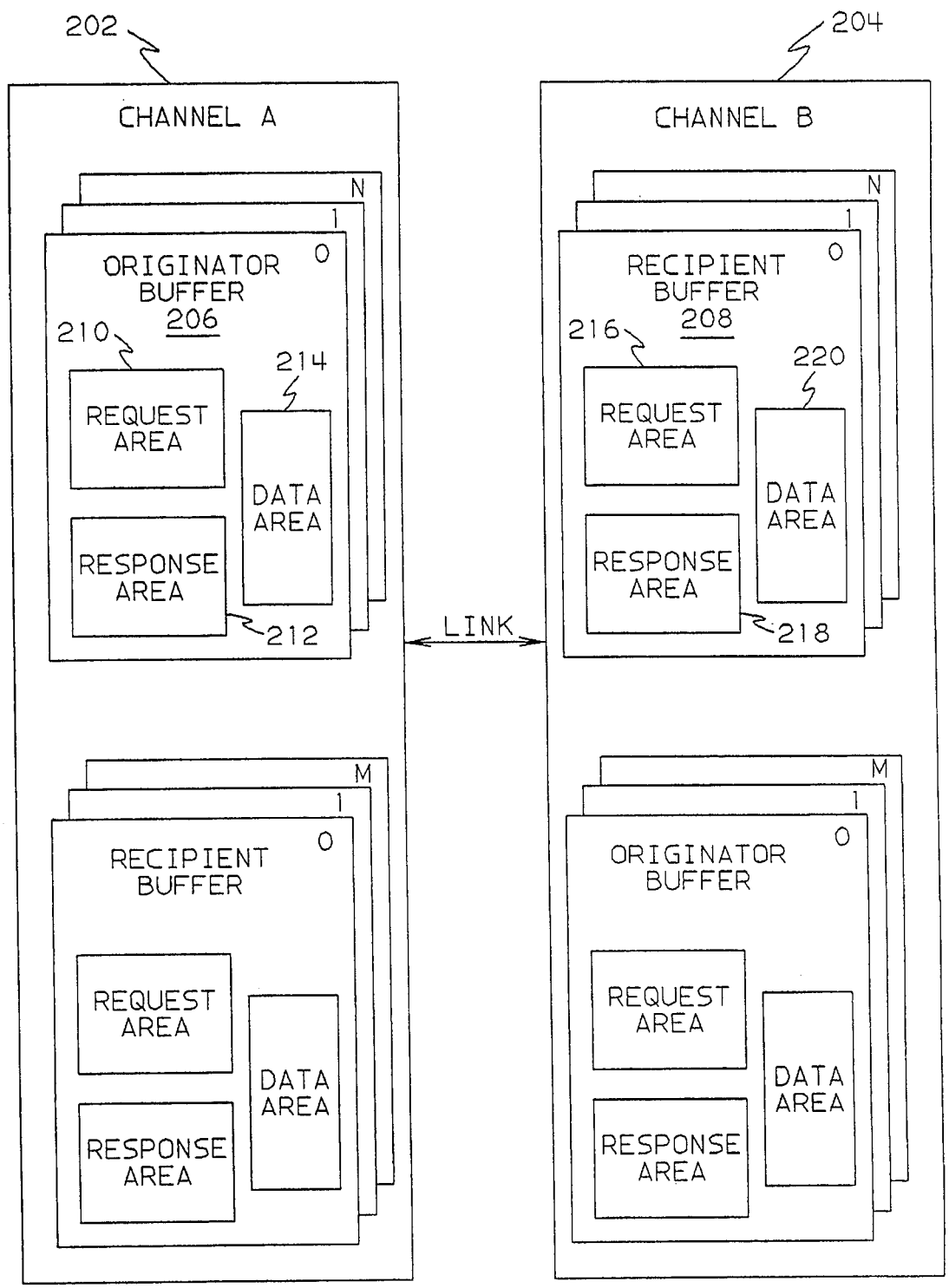
FIG. 2 illustrates a multimessage channel buffer structure.

To process a complete message with data requires buffers in both computing elements 102, 104. The computing element that initiates the message is the originator, and the computing element that processes the message is the recipient. FIG. 2 shows multiple buffers on both sides of a link. For example, to pass a message with data from Channel A 202 to Channel B 204 requires the Channel A originator buffers shown in block 206 and the Channel B recipient buffers shown in block 208. Each group of buffers in blocks 206, 208 are called "buffer sets." When a message is sent, the originator buffer request area 210 is loaded with the request, and the request is sent over the link to the recipient buffer request area 216. If data is to be transferred, it is either sent from originator buffer data area 214 to recipient buffer data area 220 for a write operation, or it is sent from recipient buffer data area 220 to originator buffer data area 214 for a read operation. After data transfer, if any, the response is loaded into the recipient buffer response area 218 and sent across the link to the originator buffer response area 212.

The information transferred from one side of the link to the other is contained in frames or frame groups. This information is always targeted to a particular buffer area, and the targeting information is contained in the link-control word of the frame. This targeting information allows the frames to be multiplexed over the link in any order. As an example, returning to FIG. 2, Channel A could send a request for buffer set 1 followed by write data for buffer set 0, followed by a response for buffer set 0, etc. It should be understood that a computing element can dynamically set up various numbers of originator and/or recipient buffers depending on the number and type of links to be established.

Figure 3:
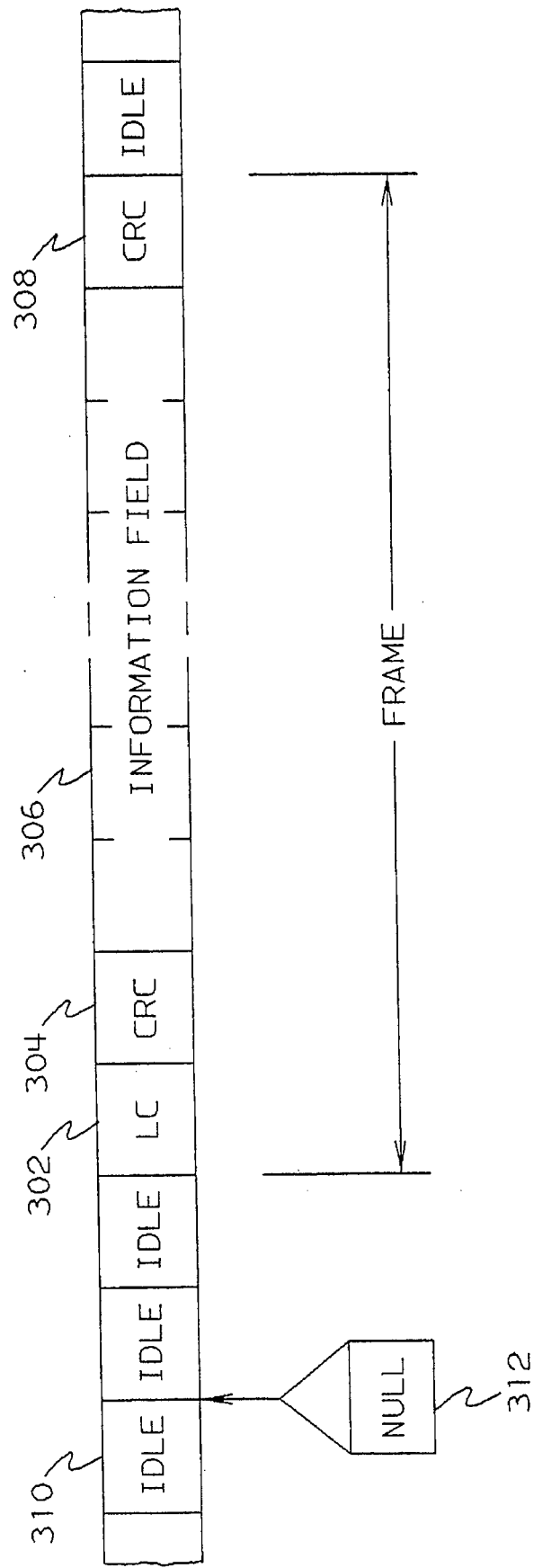
FIG. 3 is an illustration of the format of an exemplary frame.

The formal of an exemplary frame is illustrated in FIG. 3. Transmission of all information is on word boundaries and words are groups of exactly four characters. Each character has ten bits and is defined by U.S. Pat. No. 4,486,739, issued Dec. 4, 1984 to Franaszek et al. for "Byte Oriented DC Balance (0,4) 8B/10B Partitioned Block Transmission Code" and assigned to the assignee of the present invention. The idle word 310 is the K28.5 character followed by three D21.5 characters and is transmitted when no frames are being transmitted. Each frame starts with a data word which is the link-control word (LC) 302. Various fields in the link-control word 302 identify the frame format and type, designate a buffer set area, and control the state of the transceiver and link, and these fields are described in more detail later. Null words 312 can be inserted anywhere in the stream of idle or data words. These words do not affect the contents of the frames and are used to regulate the flow of information on the link. (See the above referenced:

"Null Words for Pacing Serial Links to Driver and Receiver Speeds", by Danniel F. Casper et al, Ser. No. 08/071,150, filed Jun. 1, 1993.)

A link-control-CRC (cyclical redundancy check) word 304 follows the ink-control word. The link-control CRC word 304 is conventionally generated from the values in the link-control word. The link-control CRC word is checked at the receiver to test the validity of the link-control word in the incoming frame.

There are two types of frames, control frames and information frames. Control frames do not have an information field. They consist only of a link-control word and a link-control CRC word. An information frame has a link-control word 302 a link-control CRC word 304 and an information field 306. Information fields contain, for example, from one to 1,024 words. The information field contains the information sent from a buffer set area at one end of the link to a buffer set area at the other end.

An information field is followed by an information-field CRC word 308. The information-field CRC word is conventionally generated from the values in the information field. The information field CRC word is checked at the receiver to test the validity of the information field in the incoming frame.

Figure 4:
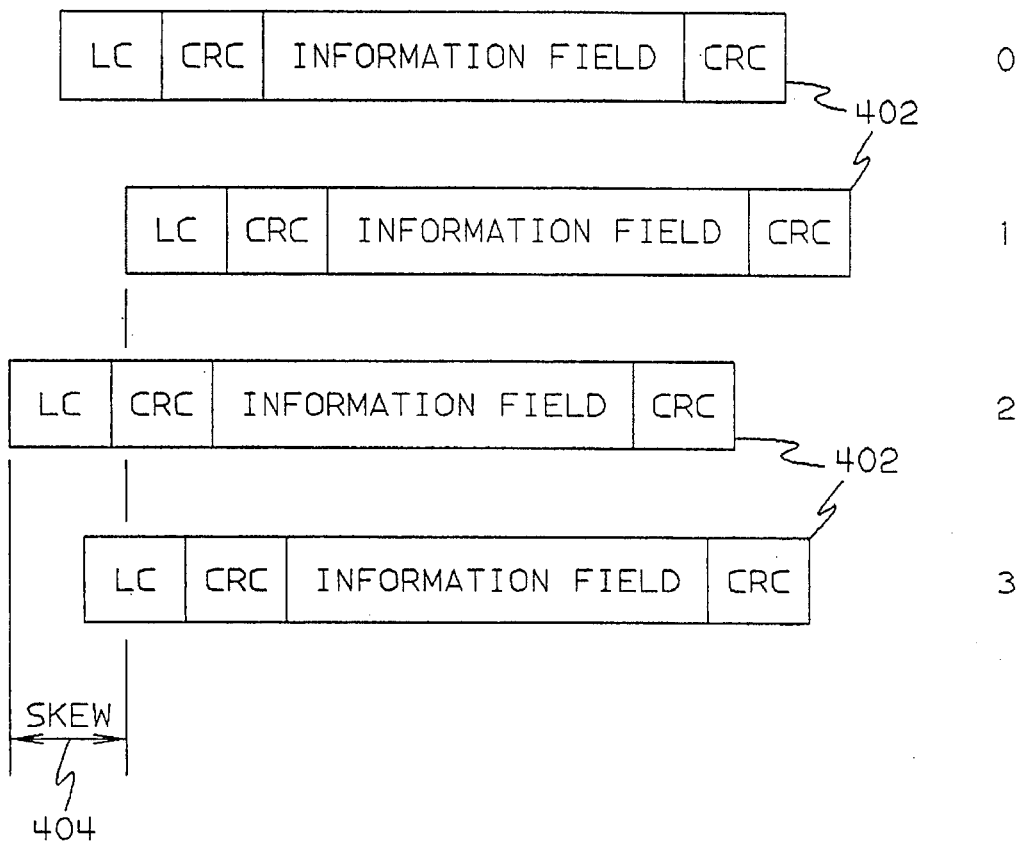
FIG. 4 is an illustration of the format of an exemplary frame group.

Related information can be placed in several frames, one on each transceiver of the operational link. These frames (referred to as a "frame group") are transmitted concurrently. There must be as many frames in the frame group as there are transceivers in the operational link. FIG. 4 shows an exemplary frame group 402 transmitted on four transceivers. The use of the frame group enables the data to be sent at a bandwidth that is multiples of the single fiber optic bandwidth since multiple frames (one per fiber) are transmitted simultaneously across the link. The time difference between the transmission or reception of the beginning of the first frame to the beginning of the last frame of the group is called skew 404.

Although not provided with sequence numbers, each frame group is largely interlocked with those of subsequent and previous frame groups. The interlocking can be accomplished by the protocol on the link. For example, each message for a particular buffer set starts with a request, followed by data, followed by a response. Each of these types of transmissions has a unique link-control word since each transmission is targeted to differing buffer set areas.

Figure 5:
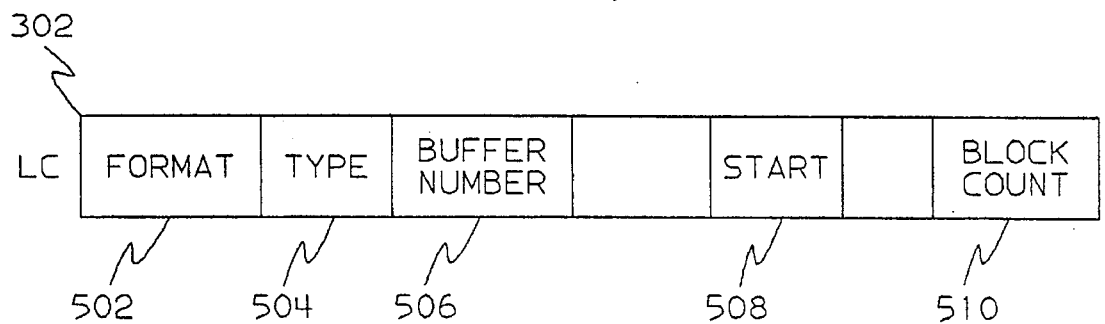
FIG. 5 is an illustration of the contents of the Link Control word.

FIG. 5 shows details of the link-control word 302. Information transferred to a particular buffer may be contained in more than one frame or frame-group. The first frame for a buffer area always has the Start 508 bit on and this bit also indicates the validity of the Block Count 510. This count indicates the total number of 256 byte blocks that will be transferred to the buffer, and this count does not indicate the length of the presently transmitted frame. The transmitter can end the frame with a CRC 308 word on any 256 byte boundary of the information 306 field. When the transmitter resumes the transfer to the buffer, it starts the new frame with the Start 508 bit in the link-control word reset to zero. The zero value of the start bit indicates that this frame is a continuation of the previous frame targeted to the same buffer. The receiver knows that all of the information has been received when the total number of 256 byte blocks transmitted in all of the frame groups have been received and satisfy the Block Count 510 transmitted in the link-control word of the first frame group. A buffer area can be transmitted by any number of frame groups from one to the total number of 256 byte blocks. For example, a 1024 byte buffer area can be transmitted in any number of frame groups from one to four. In fact, there are eight different combinations of frame group lengths that can be used to transmit a 1024 byte buffer area. These are a single four block frame group, four single block frame groups, two single block frame groups followed by a two block frame group, a two block frame groups followed by two single block frame groups, a single block frame group followed by a two block frame group followed by a single block frame group, a two block frame group followed by another two block frame group, a single block frame group followed by a three block frame group, and a three block frame group followed by a single block frame group. Longer buffer areas have even more possibilities. The only rule is that the 256 byte blocks are sent in ascending order.

The ability to split the transfer of information to a buffer set area has two distinct advantages. First, the channel can start transmitting the frame group before the entire buffer set area is fetched from main store. At any time during the transmission, data required to send the information field may become unavailable for a while. In this case it is desirable for the transmitter to end the frame and restart it when the data flow from main processor storage resumes. Second, frame groups can be interleaved in any combination. This interleaving capability allows the best possible utilization of the link since whatever data can be sent that is available and higher priority frame groups, such as requests or responses, can interrupt longer running data area frame groups.

In addition to the idle sequence, there is a group of sequences that is similar to the idle sequence and are used to signal primitive link conditions. All of these sequences are the logical extensions to the sequences defined by U.S. Pat. No. 5,048,062, issued Sep. 10, 1991 to Gregg et al. for "Transmitting Commands Over a Serial Link" and assigned to the assignee of the present invention. In the referenced patent, these sequences are the idle character, K28.5, alternated with a data character. In the link described by the present invention, these sequences are the idle word alternated with a data word. The data words chosen are similar to the idle word and are composed of the identifying data character followed by three D21.5 data characters. Recall that the idle word also contains three D21.5 data characters. The identifying data characters are the same as those in the referenced patent. In the referenced patent, eight consecutive pairs of the idle character alternated with the data character must be received before the condition is recognized by the receiver. In the present invention, four consecutive pairs of the idle word alternated with the data word must be received.

Figure 6:
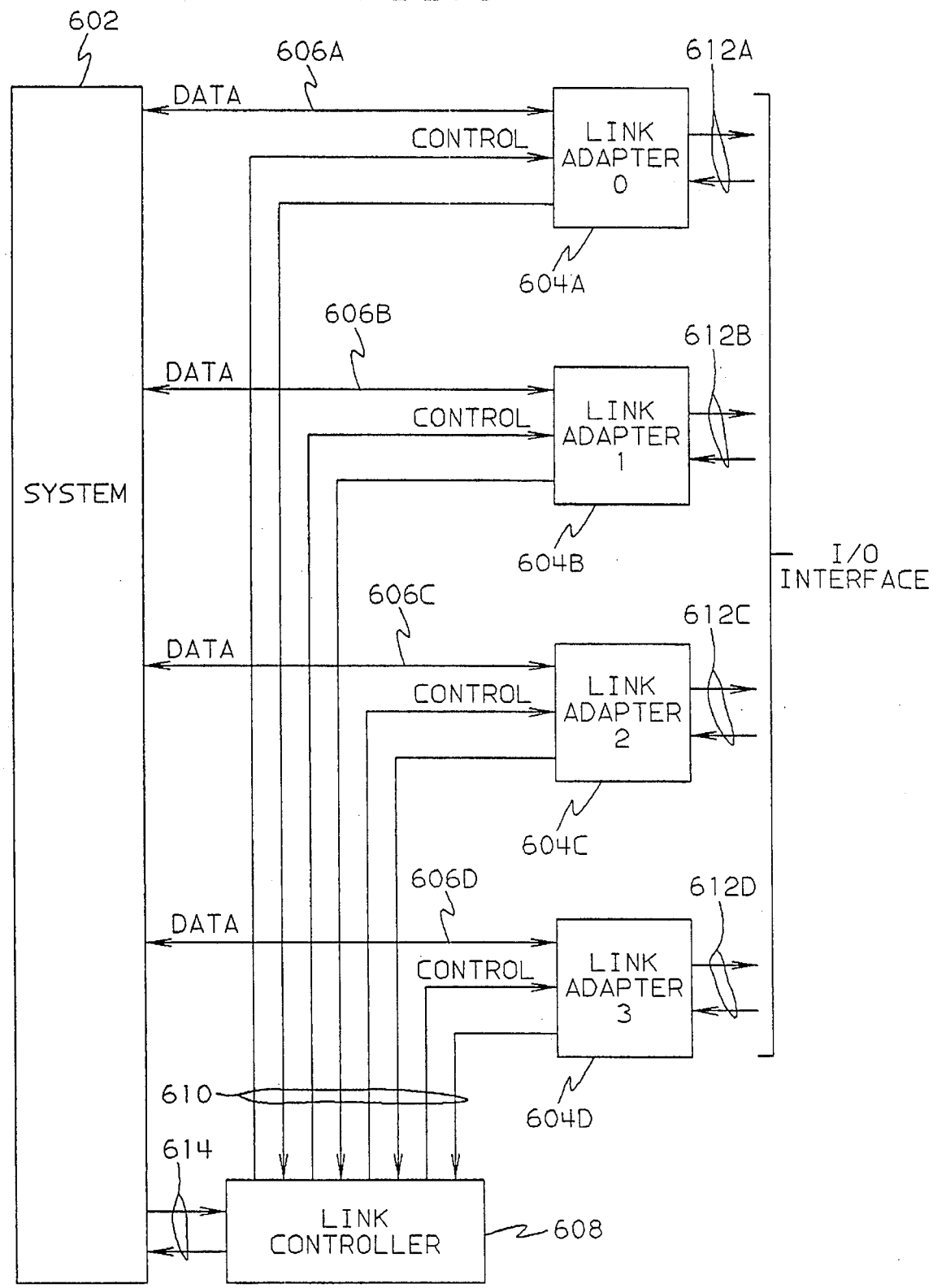
FIG. 6 is a block diagram of one end of a multiconductor link.

The multiconductor channel shown in FIG. 6 communicates over a four fiber pair link. Each of the four fiber pairs 612(A,B,C,D) is controlled by a Link Adapter 604(A,B,C,D), and each of these Link Adapters operates in a largely independent fashion. For example, each of the Link Adapters has its own data buffering and its own interface oscillator. The primary data path to the System 602 is over the four bidirectional Data 606(A,B,C,D) buses. The flow of information is managed by the Link Controller 608. The Link Controller communicates with the Link Adapters 604(A,B,C,D) over multiple Control 610 lines, and it communicates with the System over another group of control lines 614. The Link Controller contains a microprocessor and logic required to synchronize the operation of the Link Adapters 604(A,B,C,D).

Figure 7:
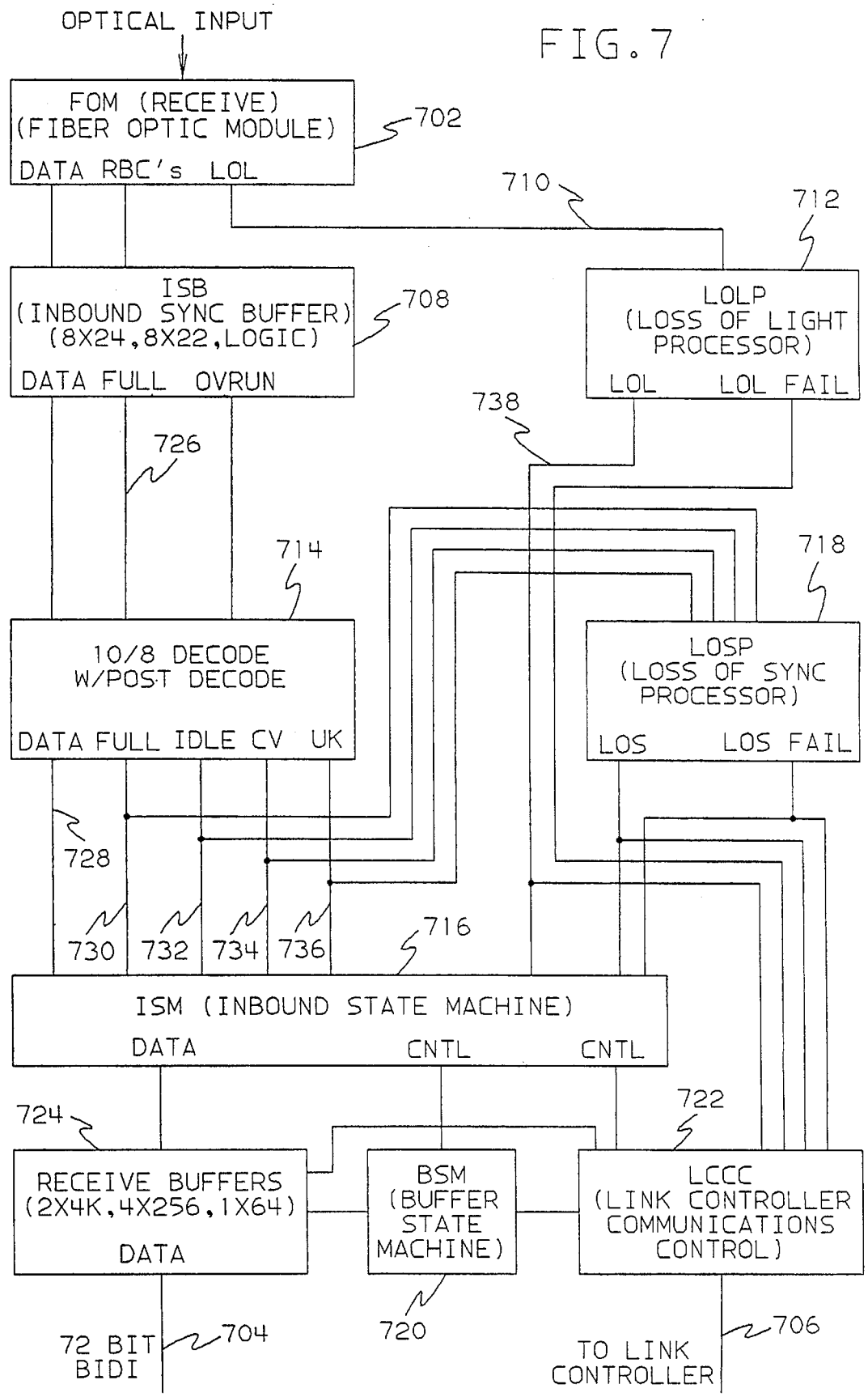
FIG. 7 is a block diagram of a Link Adapter.

FIG. 7 shows the inbound elements of the Link Adapter 604 hardware which receive information from the Fiber Optic Module 702 (FOM) and present it to the Link Controller 608 over a bi-directional data bus 704 and a control bus 706. Information is received from the FOM and sent to the Inbound Sync Buffer 708 (ISB) which synchronizes the data clocked by the FOM to the System clock. The Loss Of Light line 710 indicates that the FOM is not receiving a signal and this line is sent to the Loss Of Light Processor 712 (LOLP) which determines a loss of light link failure condition. The ISB 708 feeds the 10/8 Decoder 714 which then feeds the Inbound State Machine 716 (ISM) and the Loss Of Sync Processor 718 (LOSP). The LOSP 718 determines when the FOM has lost bit and character synchronism, and the ISM controls the receive buffers through the Buffer State Machine 720 which will be described in detail below. Information sent to the Link Controller is prioritized and sent by the Link Controller Communications Controller 722 (LCCC). The seven Receive Buffers 724 are controlled by the the BSM 720 and receive the information fields from the inbound frames. The operation of the BSM will also be described in detail below.

The ISM 716 examines the sequence of words and errors from the 10/8 Decoder 714, LOLP 712, and LOSP 718 to recognize the idle sequence, continuous sequences, and frames (with or without information fields). The operation of the ISM 716 is completely defined by the state table shown in FIG. 8.

Along the top of the ISM state table 800 shown in FIG. 8 are the signals received 802 from the 10/8 Decoder 714, LOLP 712, and LOSP 718. Along the left side of the table are the ISM states 804. Each box in the table has two areas. On the top line is the next state 806. For example, if the ISM is in the RESET state and an IDLE word is received, the next state is IDLE,0. In some boxes there are 2 or 3 next states (separated by '/'). In this case the actions (shown below) describe how to choose the next state. On the bottom line are the actions 808 which are numbered 1 to 18 (4 is not used). For example, if the ISM is in IDLE,6 state and an IDLE word is received, action '3' is performed. Action '3' is setting the idle indicator (and sending it to the Link Controller).

The signals received from the 10/8 Decoder 708, LOLP 712 and LOSP 718 are combined to form the four inputs 802 to the ISM. These inputs 802 are:

IDLE. An idle word was received by the ISM. This signal comes directly from the 10/8 Decoder over control line 732. The idle word is the K28.5 character followed by three D21.5 characters.

DATA. A valid data word was received by the ISM and is signaled over control line 728. Valid data words consist of four data characters and are represented by DXX.Y, DXX,Y,DXX,Y,DXX.Y.

CV/UK. This is the logical OR of the Code Violation (CV) 734 and Unused K character (UK) 736 signals from the 10/8 Decoder.

LOS, RESET. This is the logical OR of the Loss Of Light (LOL) 738 signal and the reset latch. The reset latch is set when any hardware error is detected in the Link Adapter.

The ISM states 804 are:

RESET. This state is entered when a LOL, LOS, LOL FALL, LOS FALL, or RESET condition is detected. The state indicates that either four pairs of idle words or four continuous sequence word pairs must be detected before the ISM is ready to detect frames. This state is also entered if an error is encountered while the ISM is detecting either the idle or the continuous sequence. While in the RESET state, CV and UK reports to the Link Controller are suppressed. The microprocessor through the Link Controller can force the ISM into the RESET state.

IDLE,0,1,2,3,4,5,6,7. These idle states are stepped through as the ISM is detecting four pairs of idle words. In IDLE,6 the ISM has detected seven idle words. If another idle word is received while in this state, the ISM sets the IDLE SEQ indicator to the Link Controller and steps to the IDLE,7 state. In the IDLE,7 state, the ISM must detect one more idle word before it can recognize a frame. This ninth idle word may be the be the start of frame delimiter for the frame.

IDLE. This state indicates that the last idle word detected may be the start of frame delimiter for a frame. If a data word is received while in this state, the ISM steps to the DATA0 state. Since this data word may be either a continuous sequence or a link-control word, it is examined to see if it is of the form DXX.Y,D21.5,D21.5, D21.5. If it is, it may be the start of a continuous sequence. In this case the DXX.Y byte is saved in the CS byte register and the continuous sequence (CS) byte valid latch is set.

CS,0,1,2,3,4,5,6. These states are stepped through as the ISM is detecting four pairs of continuous sequence words, or continuing to detect an ongoing continuous sequence. In the CS,6 state, the ISM has detected three pairs of continuous sequence words followed by an idle word. If while in this state another data word is received (and it matches the previous data words of the continuous sequence), the CS indicator (along with the continuous sequence byte) is sent to the Link Controller. CS,0 state is used after four pairs of the continuous sequence have been detected and the sequence persists.

DATA0. This state indicates that the ISM has detected a valid start of frame idle word followed by a data word. Depending on what is received next, this interface sequence may be either the start of a frame or a continuous sequence. If while in this state an idle word is received and the CS byte valid latch is set; the ISM steps to the CS,2 state. If while in this state a data word is received, it is the CRC of the link-control word and the ISM steps to the DATA1 state. If the CRC is correct, the link-control word is sent to the Link Controller.

DATA1. This state indicates that the ISM has detected a link-control word followed by good CRC. If while in this state an idle word is detected, the IFSM steps to the IDLE state and verifies that the link-control word specified a frame with no information field. If while in this state a data word is received, the ISM steps to the DATA2 state and verifies that the link-control word specified a frame with an information field.

DATA2. This state indicates that the ISM has detected the first data word of the frame information field. If while in this state an idle word is received, the ISM detects a word sequence check (SEQ CHK) and steps to the ERROR state. If while in this state a data word is received, the ISM steps to the DATAN state.

DATAN. This state indicates that the ISM has detected the first two data words of the frame information field. If while in this state another data word is received, the ISM stays in the DATAN state. If while in this state an idle word is received, the idle word is the end of frame delimiter. The CRC is checked, and the ISM steps to the IDLE state.

ERROR. This state indicates that some kind of error has been detected and that the receipt of a single idle word causes the ISM to step to the IDLE state.

The ISM actions 808 are:

1) Set appropriate indicator (CV or UK), notify the BSM, reset CS indicator.

2) Set appropriate indicator (LOS, LOL, LOS FAIL, LOL FAIL), notify BSM, reset CS indicator.

3) Set IDLE SEQ indicator.

4) Unused.

5) Reset CS indicator.

6) Set SEQ CHK indicator.

7) If DATA=DXX.Y,D21.5,D21.5,D21.5, set CS byte, go to CS,1. If not, set SEQ CHK, go to RESET 8) If DATA=DXX.Y,D21.5,D21.5,D21.5, set CS byte, set CS byte valid.

If DATA not=DXX.Y,D21.5,D21.5,D21.5, reset CS byte valid.

9) If DATA=DXX.Y,D21.5,D21.5,D21.5, and CS byte compares, go to CS,1.

If DATA=DXX.Y,D21.5,D21.5,D21.5, and CS byte does not compare, set CS byte, reset CS indicator, go to CS,1.

If DATA not=DXX.Y,D21.5,D21.5,D21.5, set SEQ CHK, reset CS indicator, go to RESET.

10) If CS indicator on, go to CS,0.

If CS indicator off, go to CS,2.

11) If DATA=DXX.Y,D21.5,D21.5,D21.5, and CS byte compares, go to CS,3 or CS,5.

If DATA=DXX.Y,D21.5,D21.5,D21.5, and CS byte does not compare, set SEQ CHK, set CS byte, go to CS,1.

If DATA not=DXX.Y,D21.5,D21.5,D21.5, set SEQ CHK, go to RESET.

12) If DATA=DXX.Y,D21.5,D21.5,D21.5, and CS byte compares, set CS indicator, send CS byte to Link Controller, go to CS,1.

If DATA=DXX.Y,D21.5,D21.5,D21.5, and CS byte does not compare, save CS byte, set SEQ CHK, go to CS,1.

If DATA not=DXX.Y,D21.5,D21.5,D21.5, set SEQ CHK, go to RESET.

13) If CS byte valid is on, go to CS,2.

If CS byte valid is off, set SEQ CHK, go to ERROR.

14) If CRC is good, send link-control word to Link Controller, send link-control word to BSM.

If CRC is bad, set CRC CHK, go to ERROR. If the previous data word is of the from DXX.Y,D21.5,D21.5, D21.5 then set SEQ CHK.

15) If link-control word specifies no information field, go to IDLE.

If link-control word specifies an information field, set SEQ CHK, notify BSM, go to ERROR.

16) If link-control word specifies no information field, set SEQ CHK, go to ERROR.

If link-control word specifies an information field, send DATA to BSM, go to DATA2.

17) Send DATA to BSM.

18) If CRC is good, notify BSM, BSM sends EOF to Link Controller.

If CRC is bad, set CRC CHK, notify BSM, BSM sends EOF to Link Controller.

The ISM outputs include controls to the BSM and indicators which are sent to the Link Controller. The indicators are set by the ISM and reset when they are eventually sent to the Link Controller. The indicators are:

IDLE STATE

IDLE SEQ indicator (Idle sequence detected)

CS indicator (continuous sequence)

SEQ CHK (word sequence check)indicator

CRC CHK indicator

EOF indicator (end of frame)

The BSM 720 controls the loading and maintains the status of the six receive buffers and a maintenance buffer. The six receive buffers consist of two 4K byte data area buffers and four 256 byte request and response area buffers. The 64 byte maintenance buffer is used to receive initialization frames. Each of the buffers has its own set of associated states, and all of the buffers are loaded in a similar way. The operation and states associated with the two data area buffers is more complicated than the other five buffers since the receipt of information for a data area may be transmitted in multiple frame groups. The other five buffers are limited to a single 256 byte block and must be transmitted in a single frame group.

Each time the ISM recognizes a valid link-control word specifying a frame with an information field, the ISM sends the link-control word to the BSM (ISM, action number 14). If there are no errors on the link, the ISM follows the link-control word with data words. When the ISM detects the end of frame delimiter (an IDLE word), it checks the CRC using the previous word and notifies the BSM that the last data word sent was CRC and that the CRC is good. When there are errors after the link-control word is recognized, the ISM notifies the BSM, and the BSM takes the appropriate action described below.

When the link adapter is on line, the maintenance buffer is not used and bits 6, 7, and 15 of the link-control word are examined to determine which of the six receive buffers is loaded. If link-control word bit 7 is off, the frame is for either a request or response area buffer, and bits 6 and 15 of the link-control word determine which of the four request or response area buffers is to be loaded. When link-control word bit 6 is on, one of the response area buffers is loaded, and when bit 6 is off, one of the request area buffers is loaded. Link-control word bit 15 selects which of the two request area buffers or two response area buffers is loaded. If link-control word bit 7 is on, one of the two data area buffers as determined by link-control word bit 15 is loaded.

The operation and states associated with the maintenance and the four request and response area buffers is almost identical. The only difference is in the word count handling. For these five buffers, the receive buffer states inhibit the receipt of erroneously generated frames from damaging the contents of the receive buffer. Using these states also simplifies the design of these buffers since they do not have to be written and read at the same time. The received frames are written into the buffer and after the entire buffer is full, the contents is read and sent to the System. Each of these five buffers has three states (UNLOCKED, LOCKED, and ERROR). These three states are implemented with two latches called LOCKED and ERROR. Both latches are never on at the same time, and when both latches are off, the buffer is in the UNLOCKED state. When a link-control word is received for one of these five buffers and it is in either the LOCKED or ERROR state; the the data following is discarded, the buffer busy indicator is set and the buffer remains in either the UNLOCKED or the ERROR state. When a link-control word is received and the buffer is in the UNLOCKED state, the data following is stored in the appropriate buffer. As the data is being received, the word count is checked. With all five of these buffers, the frames can be less than the buffer size. The maximum size information field allowed depends on which buffer is selected. If the maintenance buffer is selected, the maximum size is always 64 bytes. If one of the four request or response area buffers is selected, the maximum size depends on the number of transceivers which are on-line (configured). If one transceiver is on-line, the maximum size is 256 bytes; if two transceivers transceivers are on-line, the maximum size is 128 bytes, and if four transceivers are on-line, the maximum size is 64 bytes. With all five buffers, when the maximum size has been exceeded, the BSM sets the buffer overrun indicator, and the buffer is set to the ERROR state. If the information field of the frame is not exceeded, the end of frame indicator is set, and the buffer state is set to LOCKED.

When one of the four request or response area buffers is selected, the start bit in the link-control word is checked to be on and the block count is checked for a value of one. If these bits are not correct, the BSM sets the SEQ CHK indicator and goes to the ERROR state.

If the ISM detects an error on the link which prematurely ends the frame (CV, UK, SEE:) CHK, CRC CHK, LOL, LOS, RESET) the buffer is set to the ERROR state.

The operation of the four request and response area buffers and the maintenance buffer is defined in the state table 902 in FIG. 9. Along the top of the table are the states 904, and along the left side of the table are the events 906 received from the ISM and lock and unlock commands from the Link Controller. Each box in the table has two areas. On the top line is the next state 908. For example, if the BSM is in the UNLOCKED state and a link-control word is received, the BSM stays in the UNLOCKED state waiting for the end of frame. In one box there are two next states (separated by '/'). In this case the actions (shown below) describe how to choose the next state. On the bottom line are the actions which are numbered 1 to 3. For example, if the BSM is in the UNLOCKED state and a link-control word is received, the BSM takes action number 1. The BSM events 906 are:

LCW DET. The ISM detected a link-control word (LCW) for this request or response area or maintenance buffer DATA. The ISM sends data from an information field and checks buffer overrun conditions.

EOF DET. The ISM detected an EOF (end of frame with good CRC). The BSM will verify the count.

ERROR. The ISM has detected an error while receiving the information field of the frame (CV, UK, SEQ CHK, CRC CHK, LOL, LOS, RESET). The BSM also detects some errors (described later).

UNLOCK COMMAND. A buffer unlock command has been received from the Link Controller.

LOCK COMMAND. A buffer lock command has been received from the Link Controller.

The BSM states 904 are:

UNLOCKED. This state indicates that the buffer is ready to receive data. If a link-control word is received from the ISM, the data from the information field is loaded into the buffer starting at address 0. If the Link Adapter is configured, the block count in the link-control word is checked for a value of 1, and the start bit in the link-control word is checked for a value of 1. If these fields are correct, the BSM remains in the UNLOCKED state waiting for data. If either of these fields is not correct, the BSM sets SEQ CHK and goes to the ERROR state. If the Link Adapter is not configured, all frames with an information field are placed in the maintenance buffer; no further link-control word checking is performed. In the ERROR state the BSM ignores EOF, ERROR, and UNLOCK events. As the BSM receives data, the buffer count is checked. If the count is exceeded, the BSM sets buffer overrun and goes to the ERROR state. When the EOF is received, the BSM sets the EOF, Count Satisfied indicator and goes to the LOCKED state.

LOCKED. This state inhibits any more data from being written into the buffer. If a link-control word is received, the BSM does not change state and sends buffer busy to the Link Controller. The BSM ignores all other events (DATA, EOF, ERROR) except for the UNLOCK command.

ERROR. This state indicates that an error occurred while receiving an information field or detecting an error in either the block count, start bit, or the frame length. The BSM remains in this state until the buffer is either locked or unlocked, and it ignores other events (DATA, EOF, and ERROR). If a link-control word is received, the BSM sends buffer busy to the Link Controller.

The BSM actions 910 are:

1) If the Link Adapter is configured, and
   if link-control word block count is 1 and the start bit is 1, stay in the UNLOCKED state and wait for data.
   if not, set SEQ CHK, go to ERROR If the Link Adapter is not configured, stay in the UNLOCKED state and wait for data.

2) set buffer busy.

3) Check buffer fullness. If buffer not full, accept data.
   If buffer count exceeded, set buffer overrun, go the ERROR state.

4) Send EOF Count Satisfied to Link Controller, go to LOCKED state.

As mentioned above, the operation and states of the two data area buffers is more complicated since multiple frames may used to transmit the data area buffer. For these two buffers, the receive buffer states inhibit the receipt of erroneously generated frames from damaging the contents of the receive buffer. Using these states also allows data from the link to be discarded after a link error has been detected. The buffer states then allow the received data area buffers to be primed to recognize the next frame with the start bit set, and begin receiving the information field. In addition to the LOCKED, UNLOCKED and ERROR states, there is the ACTIVE state. These four states are implemented with three latches called ACTIVE, LOCKED, and ERROR. No more than one of these latches is ever on at the same time, and when all three latches are off, the buffer is in the UNLOCKED state. The LOCKED and ERROR states are almost identical except for setting the buffer busy indicator.

When a link-control word is received for one of the data area buffers, the start bit and the block count in the link-control word are examined by the BSM. If the start bit is on, the block count is captured by the BSM.

The operation of the BSM for the two data area buffers is defined in the state table in FIG. 10. The arrangement of this table is the same as the arrangement of state table 902 of FIG. 9.

The BSM events 1006 for the two data are buffers are:

LCW DET, Start=0. The ISM detected a link-control word (LCW) with the start bit off for this data buffer.

LCW DET, Start=1. The ISM detected a link-control word (LCW) with the start bit on for this data buffer.

DATA. The ISM sends data from an information field and checks buffer overrun conditions.

EOF DET. The ISM detected an EOF (end of frame with good CRC). The BSM will verify the count.

ERROR. The ISM has detected an error while receiving the information field of the frame (CV, UK, SEQ CHK, CRC CHK, LOL, LOS, RESET). The BSM also detects some errors (described later).

UNLOCK COMMAND. A buffer unlock command has been received from the Link Controller.

LOCK COMMAND. A buffer lock command has been received from the Link Controller.

The BSM states 1004 for the two data buffers are:

UNLOCKED. This state indicates that the buffer is ready to receive data. If a link-control word is received from the ISM and the start bit is on, the data from the information field is loaded into the buffer starting at address 0. Also the block count is captured by the BSM and checked to see if it is between 1 and 16. If the block count is in this range, the BSM goes to ACTIVE state. If the block count is not in this range, the BSM sets SEQ CHK and goes to the ERROR state. If the start bit is off, the BSM stays in the UNLOCKED state. The BSM ignores the DATA, EOF, ERROR, and UNLOCK events when it is in this state.

ACTIVE. This state is entered from the UNLOCKED state after a link-control word with the start bit on is received from the ISM. If another link-control word is received with the start bit off, the BSM remains in the ACTIVE state. If another link-control word is received with the start bit on, the BSM goes to the ERROR state. As data is being received, the BSM checks to see if the block count has been exceeded. The block count is exceeded if the number of bytes received is greater than 256 times the block count when one transceiver is on-line, 128 times the block count when two transceivers are on line, or 64 times the block count when four transceivers are on-line. If the block count is not exceeded, the BSM remains in the ACTIVE state. If the block count has been exceeded, the BSM sets buffer overrun and goes to the ERROR state. When an EOF is received, the BSM checks to see that the frame ended on a block boundary (256 bytes for one transceiver on-line, 128 bytes for two transceivers on-line, and 64 bytes for four transceivers on-line). If the frame did not end on a block boundary, the BSM sets SEQ CHK and goes to ERROR state. If the frame did end on a block boundary and the block count has not been satisfied, the BSM sends the EOF Count Not Satisfied to the Link Controller and remains in the ACTIVE state. If the frame did end on a block boundary and the block count has been met, the BSM sends the EOF Count Satisfied to the Link Controller and goes to the LOCKED state.

LOCKED. This state inhibits any more data from being written into the buffer. If a link-control word is received, the BSM does not change state and sends buffer busy to the Link Controller. The BSM ignores the DATA, EOF, ERROR, and LOCK events and only processes UNLOCK commands.

ERROR. This state indicates that an error occurred while receiving an information field, receiving a link-control word with the start bit on while in ACTIVE state, or detecting an error in either the block count or the frame length. The BSM remains in this state until the buffer is locked or unlocked, and it ignores all other events (LCW, DATA, EOF, and ERROR).

The BSM actions 1010 are:

1) If link-control word block count is between 1 and 16, go to ACTIVE.

If not, set SEQ CHK, go to ERROR

2) If buffer overrun (too much data for block count), set buffer overrun, go to ERROR.

If buffer OK, stay ACTIVE.

3) If buffer count satisfied, send EOF Count Satisfied to Link Controller, go to LOCKED.

If buffer count does not end on block boundary, set SEQ CHK, go to ERROR.

If buffer count ends on block boundary and is not satisfied, send EOF Count Not Satisfied to Link Controller, stay ACTIVE.

4) set buffer busy 5) set SEQ CHK.

Figure 11:
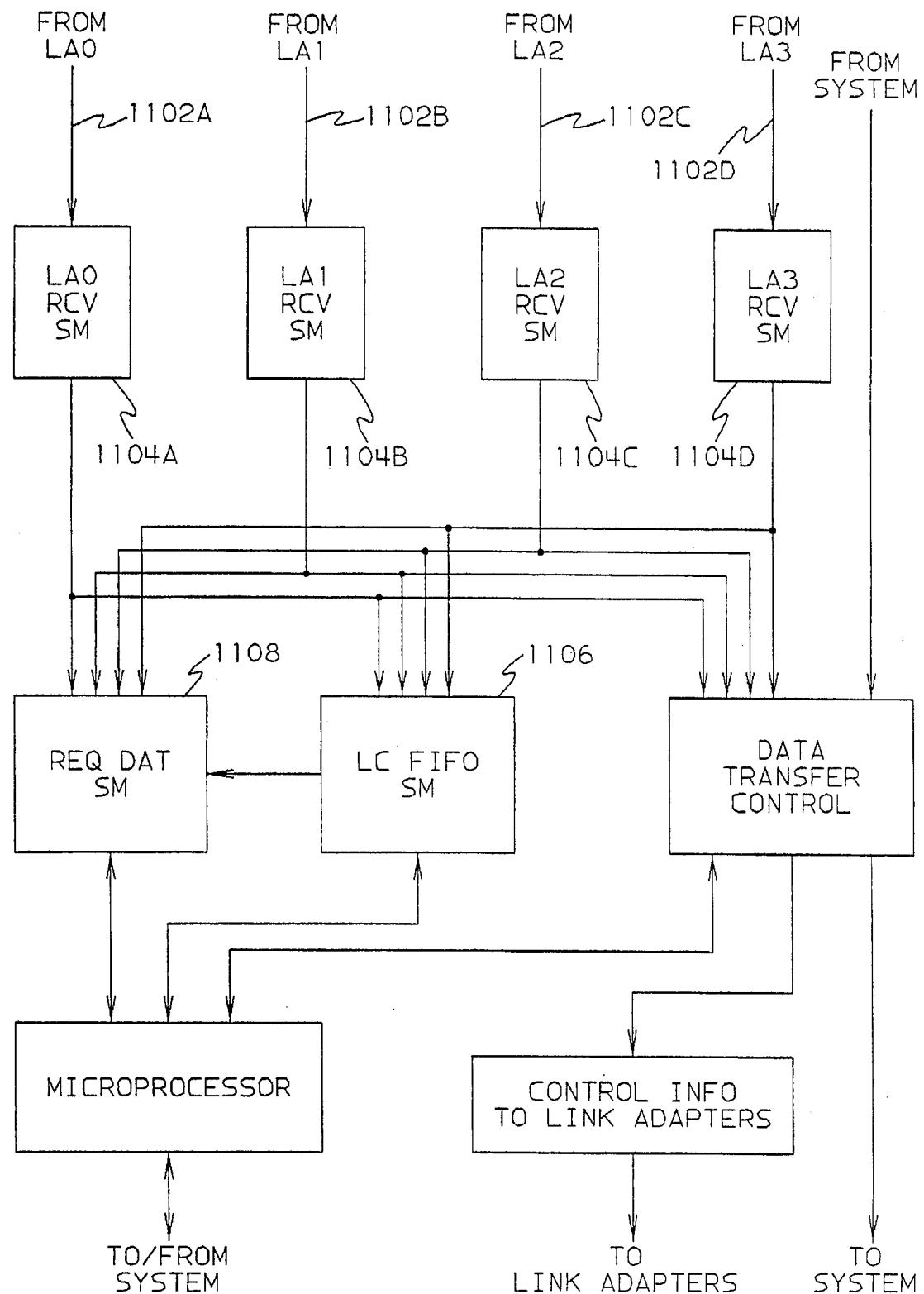
FIG. 11 is a block diagram of the internals of the Link Controller.

Not only are there buffer states associated with the BSM in the Link Adapter, but there are also buffer states maintained by the Link Controller. FIG. 11 is a block diagram of the Link Controller. Each Link Adapter sends information to the Link Controller over control lines 1102(A,B,C,D). The four Link Adapter Receive State Machines (LA RCV SM) 1104(A,B,C,D) process information from the Link Adapters. The Link Controller First In First Out State Machine (LC FIFO SM) 1106 maintains the data area buffer states. Normally, each link-control word received is stored in the LC FIFO, shown later. Since several frame groups (1 to 16) can be used to send data for the data area buffers, hardware is included in the LC FIFO SM 1106 which reduces the number of LC FIFO entries made for these frame groups. Also, there are exactly two entries made in the LC FIFO for any error free transfers to a data area buffer regardless of the number of frame groups used. The first entry is made after the first link-control word(s) are received. This entry allows the code to start moving the data as soon as the frame starts to arrive. The second entry is made after all of the data for the data area buffer has been received. With this entry, the code knows that all of the data has been successfully received.

Figure 12:
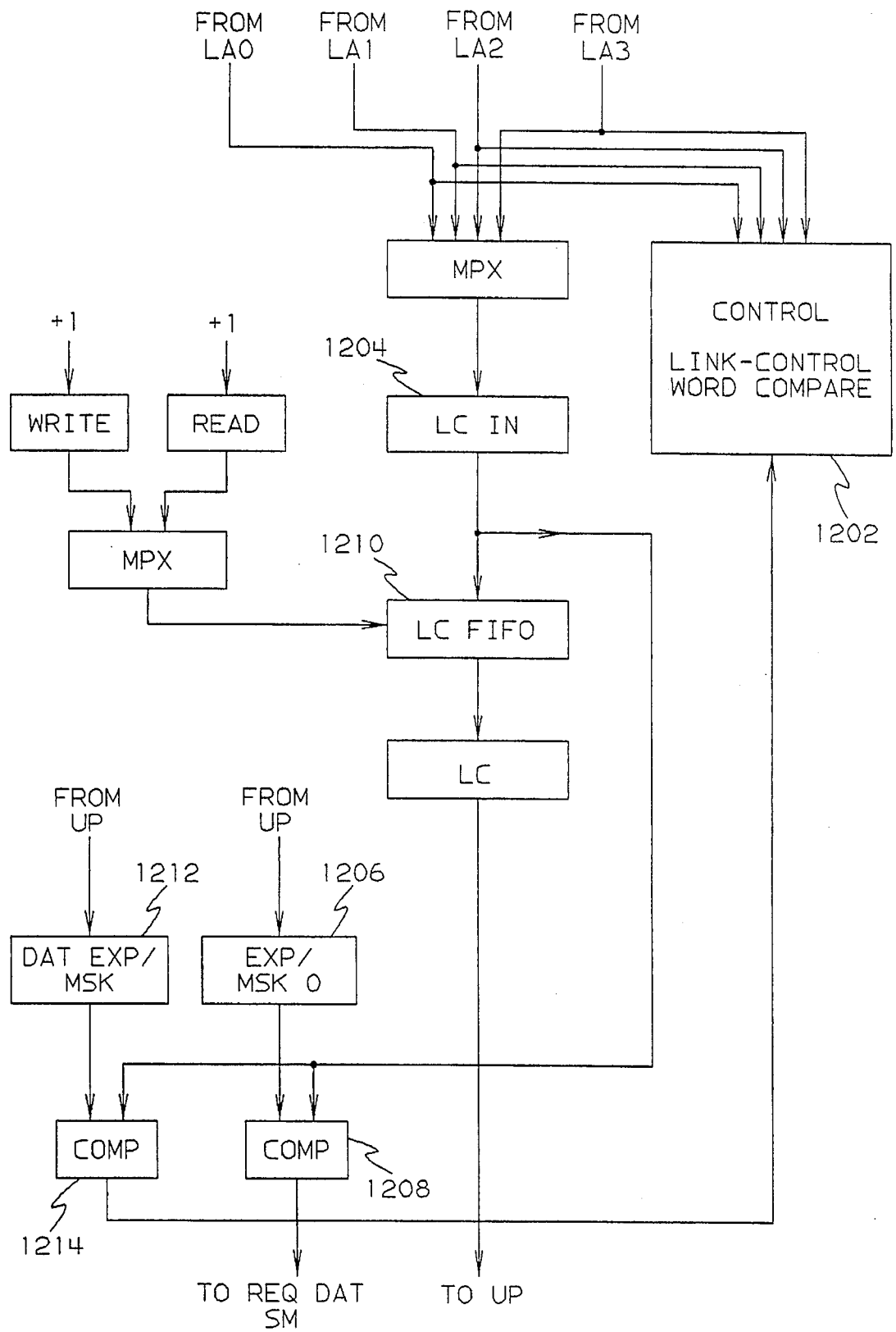
FIG. 12 is a block diagram of the internals of the LC FIFO SM.

FIG. 12 shows more detail of the LC FIFO SM 1106. As link-control words are received for the LA RCV SMs 1104(A,B,C,D), they are compared to each other in the control section 1202, and loaded into the LC IN 1204 register. The link-control words in the LC IN 1204 registers are compared to the Expect/Mask 0 (EXP/MSK 0) 1206 register by compare function 1208 as they are stored in the Link Controller First In First Out (LC FIFO) buffer 1210. The link-control words in LC IN 1204 registers are also compared to the Data Expect/Mask (DAT EXP/MSK) 1212 register by compare function 1214. The output of compare function 1214 indicates that a data area frame has been received.

Each of the two data area buffers has an associated state in the LC FIFO SM which is used to control the LC FIFO entries. In the state table 1302 in FIG. 13, the data area buffer states 1304 are shown along the top. Along the left side are the input the input events 1306. Each box in the table has two areas. On the top line is the next state 1308, and the bottom line shows if a FIFO PUTAWAY 1310 operation is performed. This FIFO PUTAWAY operation stores a link-control word into the LC FIFO 1210.

The states 1304 are:

IDLE. This state indicates that the last transfer for this data area buffer completed with no errors. In this state, all link-control words for this data area buffer are entered into the LC FIFO 1210.

ACTIVE. This state indicates that a complete link-control word was received. If the start bit in the link-control word was on, the link-control word is entered into the LC FIFO 1210 and the LC FIFO SM waits for either an end of frame or an error. If an end of frame with count not satisfied is received, the SUSPENDED state is entered. If an end of frame (EOF) with Count Satisfied is received, an LC FIFO 1210 entry is made, and the IDLE state is entered.

SUSPENDED. This sate is entered from the ACTIVE state after an end of frame with count not satisfied is received. In this state, multiple frame groups are being received for a data area buffer and more data is expected. If while in this state a link-control word is received with the start bit off, no LC FIFO 1210 entry is made and the ACTIVE state is entered.

SUP S=0. The Suppress Start=0 state is used to suppress LC FIFO entries after error events. In this state, no LC FIFO entries are made until a link-control word is received with the start bit on.

The events 1306 are:

LCW COMPLETE, Start=1. This event is the reception of a link-control word (LCW) from all Link Adapters. All of the link-control words must compare equal and must be received within the skew window. The link-control word start bit must also be on.

LCW NOT COMPLETE, Start=1. This event is the reception of a link-control word (LCW) from one or more but not all of the Link Adapters. The link-control words are not complete because either there is a link-control word miscompare which prematurely ended reception of this frame group or one or more of the link-control words is not received within the skew window. The link-control word start bit must be on.

LCW COMPLETE, Start=0, DAT EXP/MSK 1212 Compare. This event is the reception of a link-control word (LCW) from all Link Adapters. All of the link-control words must compare equal and must be received within the skew window. The link-control word start bit must also be off. Also, the contents of the LC IN register must compare equal to the contents of the DAT EXP/MSK 1212 register; in other words, the frame is for a data area buffer.

LCW COMPLETE, Start=0, DAT EXP/MSK 1212 Miscompare. This event is the reception of a link-control word (LCW) from all Link Adapters. All of the link-control words must compare equal and must be received within the skew window. The link-control word start bit must also be off. Also, the contents of the LC IN 1204 register did not compare equal to the contents of the DAT EXP/MSK 1212 register; in other words, the frame is not for a data area buffer.

LCW NOT COMPLETE, Start=0. This event is the reception of a link-control word (LCW) from one or more but not all of the Link Adapters. The link-control words are not complete because either there is a link-control word miscompare which prematurely ended reception of this frame group or one or more of the link-control words is not received within the skew window. The link-control word start bit must be off.

END OF FRAME, COUNT SAT. This event is the reception of an end of frame with count satisfied from all Link Adapters.

END OF FRAME, COUNT NOT SAT. This event is the reception of an end of frame with count not satisfied from all Link Adapters.

ERROR. This event is the reception of an error from any of the Link Adapters before an end of frame is received.

Figure 14:
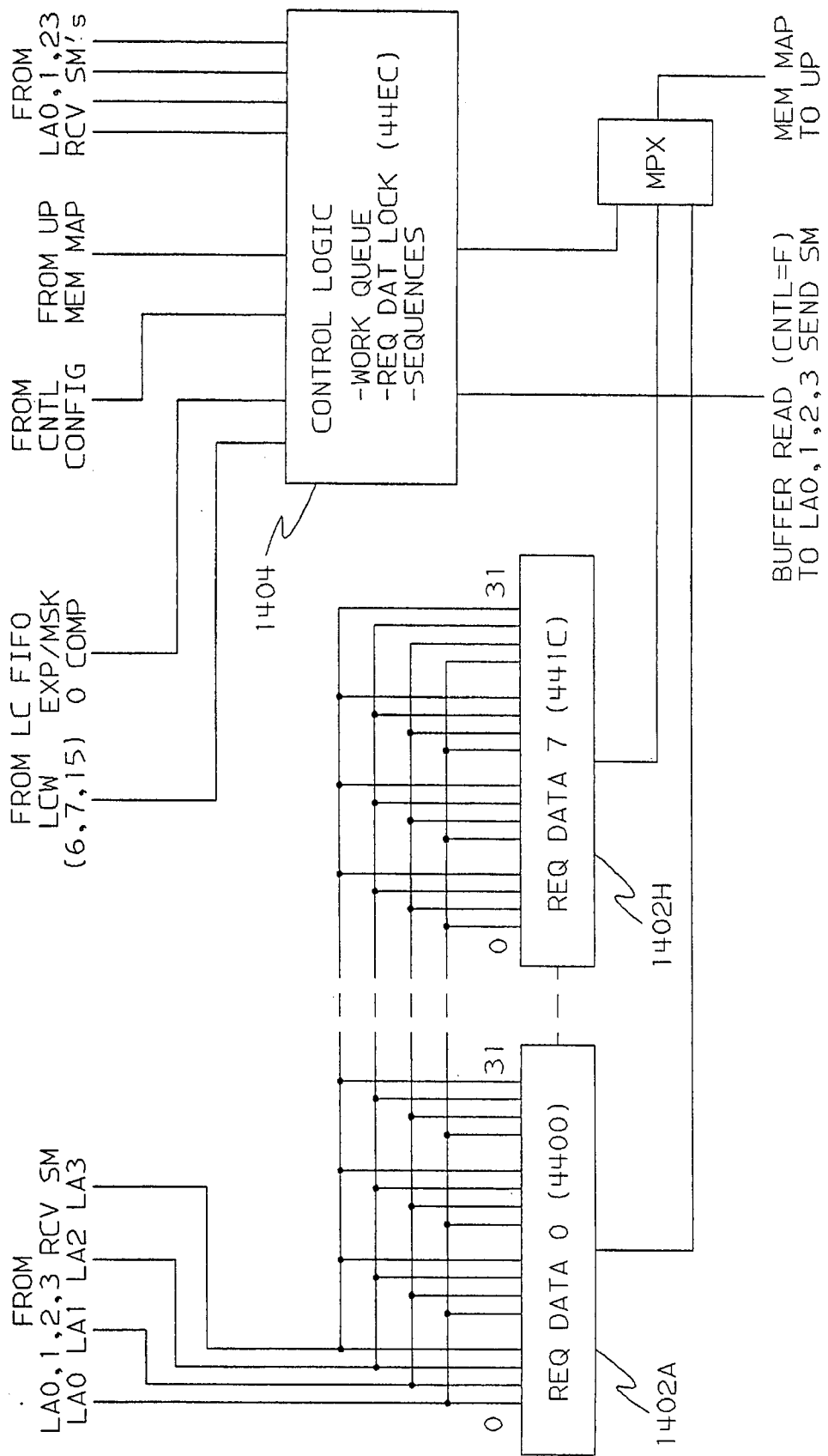
FIG. 14 is a logic diagram of the Request Data buffers in the Link Controller.

Returning to FIG. 11, the LA RCV SMs 1104(A,B,C,D) also feed the Request Data State Machine (REQ DAT SM) 1108 which is shown in greater detail in FIG. 14. The REQ DAT SM is pad of the Shared Expanded Storage Support Function (SSF) and assists in processing secondary commands received from the Coupling Function (CF). The SSF is described in "Integrity Of Data Objects Used To Maintain State Information For Shared Data At A Local Complex" by D. A. Elko et al, Ser. No. 07/860,800, filed Mar. 30, 1992, and assigned to the assignee of the present invention. The frames received from the CF include commands that invalidate local cache entries and manipulate work queue lists. The SSF also generates and sends the response frame for these commands. The information fields of these frames, both the request and response, are limited to 32 bytes.

The main function of the REQ DAT SM is to destripe data from the variable number of Link Adapters and place it into a group of registers in the proper order. This automatic destriping of the data improves the message processor performance because the message processor does not have to be aware of the number of conductors. The complexity of the code used by the message processor is reduced since the messages and responses are always viewed the same independently of the number and positions of conductors in the I/O interface. The performance to the message processor is also improved by having the data from the information field in a local buffer that is faster to access than the receive buffers in the Link Adapters FIG. 14 shows the eight REQ DATA 1402(A through H) registers. Each register is one word wide and each byte position of each register can receive data from any of the four Link Adapters. Also, the receipt of data from each of the Link Adapters is independent since data movement from the Link Adapters does not necessarily happen in unison; there may be other data movement activity on the control lines from the Link Adapters to the Link Controller. As an example, when all four Link Adapters are configured, data from Link Adapter 0 is captured in REQ DATA 0 and 4 registers, data from Link Adapter 1 is captured in REQ DATA 1 and 5 registers, data from Link Adapter 2 is captured in REQ DATA 2 and 6 registers, and data from Link Adapter 3 is captured in REQ DATA 3 and 7 registers. When only 1 Link Adapter is configured, all of the data from the one Link Adapter is captured in REQ DATA 0,1,2,3,4,5,6, and 7 registers.

Returning to FIG. 12, the EXP/MSK 0 1206 register in the LC FIFO SM 1106 is used to select which frames are retrieved from the Link Adapters by the REQ DAT SM. When the entries are made in the LC FIFO 1210, the LC IN 1204 register is compared to the EXP/MSK 0 1206 register by compare function 1208. The logic is a collection of circuits that can be initialized by the microprocessor to test various bits in the link-control words of received frames. If the LC IN register passes this test, a signal is sent to the REQ DATA SM along with bits 6, 7, and 15 of the LC IN register. These bits identify the Link Adapter receive buffer which passed the test. At this point, the REQ DATA SM is ready to start moving 32 bytes to the REQ DATA registers.

Since there are two buffer sets for receiving secondary command frames, the REQ DATA SM maintains a queue of two requests from the LC FIFO SM along with a busy and a lock bit in the control logic 1404. The busy bit is set while the REQ DATA SM is actively collecting data from the Link Adapters. When the busy bit is set, any load instructions from the REQ DATA 0,1,2,3,4,5,6,7 registers stop the microprocessor until all of the data has been retrieved from the Link Adapters. The microprocessor can also check the state of the busy bit before executing the load instruction by examining the REQ DAT LOCK register. Examining the lock bit can prevent potential instruction timeouts when a Link Adapter has a hardware failure. The lock bit is set when the REQ DATA SM has received all the data from the Link Adapters, and is reset when it is unlocked by the microprocessor.

Each of the two queue entries contains a pending bit and the three LC IN register bits (6, 7, and 15) from the LC FIFO SM. When one of the pending bits is set from the LC FIFO SM and the REQ DATA SM is not locked, it uses the three LC IN bits to generate a series of Link Controller to Link Adapter bus commands to read the data from one of the receive buffers in the Link Adapters. The number of commands generated and the target Link Adapters depends on which Link Adapters are configured. There are eight allowed configuration combinations of the Link Adapters for the operation of the REQ DATA SM (four single fiber, three dual fiber, and one quad fiber configuration). Each command to retrieve data from a Link Adapter returns 8 bytes, so a quad fiber configuration requires one command to each Link Adapter (done in parallel) to retrieve 32 bytes, and the single fiber configurations require four consecutive commands.

The ISC microprocessor sends a static response to the secondary commands. These responses have a 32 byte information field and are stored in a special buffer in the Link Adapters. Since the information field of the response frame does not change, contents of the special buffers is initialized by the microprocessor each time the number and/or position of the active fibers changes. The microprocessor 'stripes' the information field into the Link Adapter special buffers in various ways depending on how many and which fibers are active. Once the special buffers are initialized, they do not have to be altered until the number or position of fibers changes.

Once the special buffers have been initialized, the microprocessor can send a response by executing one load instruction to the Link Adapter Command register. The microprocessor loads this register when it sends a command to the Link Adapter. The value loaded into this register instructs the Link Adapters to generate a frame from the contents of a link-control word register and the special buffers. The buffer set number, 0 or 1, does not have to be known to the microprocessor and is handled by special hardware in the REQ DAT SM. When the microprocessor sends the response by loading the Link Adapter Command register, a bit in this register is set instructing the REQ DAT SM to insert the buffer set number of the active buffer set into the transmit command sent to the Link Adapters. The Link Adapters then takes this bit and merge it into link-control word bit 15 of the response frame. Another bit in Link Adapter Command register instructs the REQ DAT SM to unlock the REQ DAT registers to allow the next secondary command to be gathered from the Link Adapters.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method for use in a communication system having multiple transceivers for transmitting and for receiving data frames, and for examining bit streams received from a link for multiple carriers, comprising the steps of:

receiving a sequence of valid words over at least two carriers of said multiple carriers;

comparing each sequence of valid words to predefined sequences of words to determine therefrom an alternate communication sequence comprising one of an idle sequence, a continuous sequence and a frame;

upon determining that the alternate communication sequence comprises said frame, examining a link-control word of said frame to determine if said frame comprises either a frame having at least one information field or a frame not having at least one information field;

upon determining that the frame has at least one information field, controlling, for the at least two carriers, receive buffers in said multiple transceivers to store the at least one information field from said frame having at least one information field; and gathering the at least one information field from the receive buffers.

2. The method of claim 1, wherein said comparing step comprises comparing each sequence of valid words to exactly four predetermined word pairs of an idle word to determine the idle sequence.

3. The method of claim 1, wherein said comparing step comprises comparing each sequence of valid words to exactly four word pairs of an idle word alternated with a continuous sequence data word to determine said continuous sequence.

4. The method of claim 1, wherein said examining step for said frame not having at least one information field comprises the steps of:

(a) detecting that an idle state exists;

(b) detecting, within the frame not having at least one information field, said link-control word with a format field thereof which indicates that no information field follows;

(c) detecting and verifying a cyclical redundance check (CRC) word which follows the link-control word; and (d) verifying that a word following the CRC word is an idle word.

5. The method of claim 4, wherein if any of the conditions (a)–(d) are not true, an error is signaled.

6. The method of claim 1, wherein said examining step for said frame having at least one information field comprises the steps of:

(a) detecting that an idle state exists;

(b) detecting, within the frame having at least one information field, said link-control word with a format field thereof which indicates that said at least one information field follows;

(c) detecting and verifying a cyclical redundancy check (CRC) word which follows the link-control word;

(d) detecting any valid words of the at least one information field which follow the CRC word; and (e) detecting an idle word after detecting at least two valid words of the at least one information field and verifying that a last valid word received is a correct CRC for the at least two valid words of the at least one information field.

7. The method of claim 6, wherein if any of the conditions (a)–(e) are not true, an error is signaled.

8. The method of claim 1, wherein said step of controlling, for the at least two carriers, receive buffers includes controlling, for each of the receive buffers, independent states comprising:

an Unlocked state;

an Active state;

a Locked state; and an Error state.

9. The method of claim 8, wherein said Unlocked state facilitates the at least one information field of said frame having at least one information field and having a link-control word with a start bit being set to be stored in a corresponding receive buffer starting at a beginning of the buffer.

10. The method of claim 9, wherein said method includes checking if a block count in the link-control word is 1 if said frame having at least one information field comprises a command frame or a response frame, and checking if said block count in the link-control word is in a range of 1 to 16 if said frame having at least one information field comprises a data frame.

11. The method of claim 8, wherein said Active state facilitates the at least one information field of said frame having at least one information field and having a link-control word with a start bit being clear to be stored in a receive buffer starting at a point in the receive buffer where a previous information field completed.

12. The method of claim 8, wherein said Locked state prevents the at least one information field of said frame having at least one information field from being stored in a receive buffer and returns an indication of an attempt to write into the receive buffer to a Link Controller.

13. The method of claim 8, wherein said Error state prevents the at least one information field of said frame having at least one information field from being stored in a receive buffer.

14. The method of claim 8, wherein said independent states are updated by events comprised of:

(a) detecting a link-control word having a start bit being set, causing the independent state to change from the Unlocked state to the Active State;

(b) detecting that all of an information field as specified by a block count in the link-control word has been received, causing the independent state to change from the Active state to the Locked state;

(c) detecting an unlock command from a Link Controller, causing the independent state to change to the Unlocked state; and (d) detecting an error while receiving a frame, causing the independent state to change to the Error state.

15. The method of claim 1, wherein each of said multiple transceivers includes at least one data buffer, and wherein said method includes controlling a state of each of the at least one data buffer comprising:

an Idle state;

an Active state;

a Suspended State; and a Suppress Start=0 state.

16. The method of claim 15, wherein said comparing step includes detecting received link-control words on the multiple carriers, and wherein said Idle state performs the functions of:

allowing all of the received link-control words to be stored into a Link Controller FIFO; and changing to the Active state if a received link-control word of the received link control words passes an expect/mask test.

17. The method of claim 15, wherein said Active state waits for receipt of an end of frame indication.

18. The method of claim 15, wherein said Suspended State performs the functions of:

inhibiting a received link-control word from being stored into a Link Controller FIFO when said received link-control word has a start bit therein being clear, and when said received link-control word passes an expect/mask test; and changing to the Active state if the received link-control word passes the expect/mask test.

19. The method of claim 15, wherein said Suppress Start=0 state allows only received link-control words having start bits therein being set, to be stored into a Link Controller FIFO.

20. The method of claim 1, wherein the step of gathering the at least one information field includes the steps of:

(a) knowing which of said multiple transceivers are on line transceivers;

(b) sending requests for data from the receive buffers to the on line transceivers;

(c) storing returned data from the on line transceivers in a local array of data registers; and (d) keeping track of a buffer set number of an information field stored in the local array of data registers.

21. The method of claim 1, further comprising the step of constructing frame groups in the multiple transceivers and transmitting the frame groups over a link, said constructing frame groups includes the steps of:

(a) knowing which of said multiple transceivers are on line transceivers;

(b) distributing contents of an information field of a frame to be transmitted into one or more transmit buffers in the on line transceivers; and (c) loading a link-control word into one or more registers located in the on line transceivers.

22. The method of claim 1, wherein the communication system further includes a request data state machine, and wherein said method includes detecting one or more frames for processing by said request data state machine.

23. A communication system for transmitting and receiving data frames to and from a computer system, said communication system comprising:

multiple transceivers for transmitting to and for receiving data frames from an I/O link interface, each of said multiple transceivers being coupled to a link controller and being coupled over a bi-directional bus to said computer system;

means for examining bit streams received from a link for multiple carriers, said means for examining bit streams including:

an inbound state machine for detecting, for each individual carrier of said multiple carriers, received sequences of valid words that comprise alternate communications sequences including an idle sequence, a continuous sequence, and a frame, upon determining that the alternate communication sequence comprises said frame, said inbound state machine examining a link-control word of said frame to determine a frame having at least one information field and a frame not having at least one information field;

a buffer state machine for controlling, for each individual carrier of said multiple carriers, one or more receive buffers in said multiple transceivers to store the at least one information field from said frame having at least one information field; and a link controller which controls, for the multiple carriers, the state of all of the one or more receive buffers and gathers the information fields from the multiple receive buffers.

24. The method of claim 22, wherein the communications system further includes a plurality of buffer sets, and wherein a detected frame of said one or more frames is within a buffer set of said plurality of buffer sets, and wherein said method further includes transferring the detected frame from the buffer set to a request data buffer.

25. The method of claim 24, wherein said communications system further includes a queue having at least two entries, and wherein said method further includes identifying the detected frame in a first entry of the at least two entries of the queue.

26. The method of claim 25, wherein said method further includes identifying a second detected frame of said one or more frames in a second entry of the at least two entries of the queue.

* * * * *